Sept. 1, 1964  S. LICHTIG  3,147,035
WINDOW ARMREST
Filed Oct. 31, 1962  2 Sheets-Sheet 1
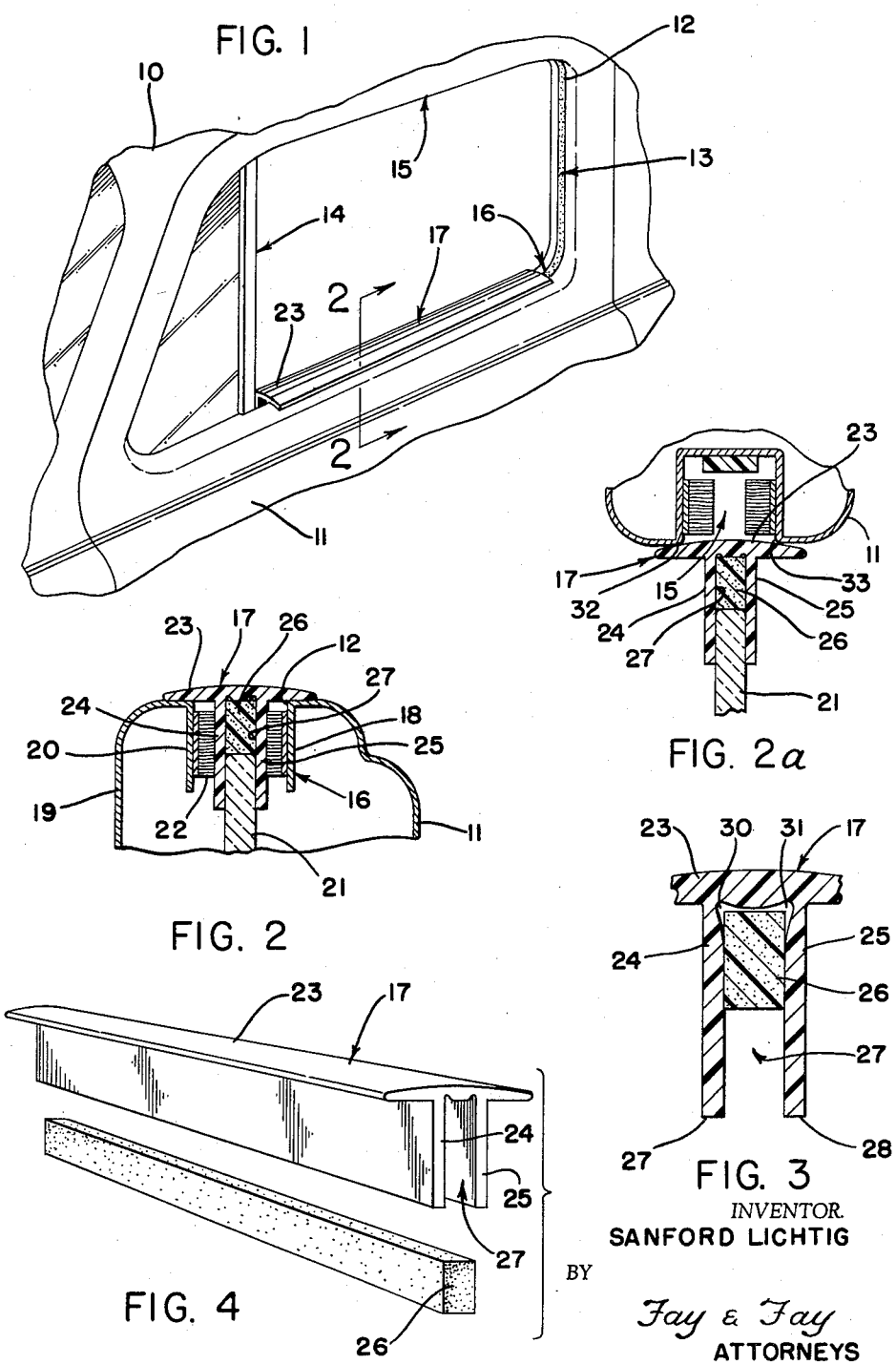
INVENTOR.
SANFORD LICHTIG
BY
Fay & Fay
ATTORNEYS Sept. 1, 1964 S. LICHTIG 3,147,035
WINDOW ARMREST
Filed Oct. 31, 1962 2 Sheets-Sheet 2

INVENTOR.
SANFORD LICHTIG
BY
Fay & Fay
ATTORNEYS

United States Patent Office 3,147,035
Patented Sept. 1, 1964

3,147,035
WINDOW ARMREST
Sanford Lichtig, 2401 Warrensville Center Road,
Cleveland, Ohio
Filed Oct. 31, 1962, Ser. No. 234,363
1 Claim. (Cl. 296—49.2)

This invention relates to an article of manufacture that is intended to be used in connection with an automobile vehicle and, more particularly, to an automobile window armrest which reduces driver or passenger discomfort and protects the window sill surface.

It is common practice for the driver of an automobile to rest his arm on the window sill while he is engaged in the operation of the automobile. Correspondingly, the right front seat passenger may wish to rest his arm in a like manner. The amount of comfort induced by resting one's arm on the window sill is dependent, to a large extent, upon the shape of the automobile window sill. Generally, an automobile window sill which provides a horizontal continuous surface of sufficient width so as to provide generous support area for the arm will yield maximum comfort.

The window sill of an automobile usually does not provide a smooth continuous surface on which the driver or passenger may rest his arm. By necessity, the window sill surface is divided into two sections which define a channel through which the window glass may be raised or lowered. Further, driver or passenger discomfort may be occasioned when the surface temperature of the window sill differs appreciably from the body temperature of the intended user. In warm periods, this temperature differential results in extremely unpleasant irritation to the body skin as witnessed by the burning sensation received by the user upon initial contact with the sill surface or the familiar sticking of the body skin to the sill surface. Moreover, this temperature differential usually results in body perspiration which has an adverse effect upon the natural luster of the sill surface and leads to a dulling or fading of the surface in the area normally contiguous to the skin. A similar unpleasant sensation is exhibited when the sill surface temperature is appreciably colder than the body temperature of the user.

Furthermore, where the outer temperature is such that a garment is generally worn by the user, the interrupted sill surface has an adverse effect upon the normal life of the garment due to the increased wear. Also, the various devices incorporated into the sleeves of said garments, such as buttons and zippers, may occasion further injury in the form of scratches to the window sill surface. Vairous forms of jewelry, such as watches and rings, may also provide a source of potential injury to the surface of the window sill.

The previous attempts to provide suitable means to eliminate driver or passenger discomfort and protect the window sill surface have either resulted in an armrest requiring a complicated method of manufacture or elaborate attaching means which necessitate the use of special means and tools.

The instant invention provides an automobile window armrest which is particularly adaptable to the reduction of driver or passenger discomfort while simultaneously eliminating the adverse effects of body perspiration and the possibility of inadvertently scratching the window sill surface. It is simple and economical to produce and may be readily attached or removed in a minimum amount of time without requiring the use of tools or alterations to the sill structure. Further, it can accommodate all particular shapes of window sill surfaces and will not interfere with normal window operation. On older model cars, the invention acts as a supplement to the worn felt strips which are normally provided to prevent movement of the window glass in a lateral direction in the containing channel. The instant device serves as an anti-vibration means while the vehicle is in operation, as well as a cushion to absorb shocks due to closing impacts on the door.

It is, therefore, an object of this invention to provide an automobile window armrest possessed with a continuous surface which minimizes the user's discomfort.

Another object of this invention is to provide an automobile window armrest which provides an insulator and protecting surface between the window sill surface and the user's arm to reduce the user's discomfort and increase the normal life of the window sill surface finish.

Another object of this invention is to provide an automobile window armrest which may be attached or removed in a minimum amount of time in the absence of complicated attaching devices or special tools.

A further object of this invention is to provide an automobile window armrest which is simple in construction and economical to manufacture.

A further object of this invention is to provide an automobile window armrest which will laterally support the window to reduce vibration.

A still further object of this invention is to provide an automobile window armrest which is adaptable to all shapes of window sills and which will not interfere with normal window operation.

Further objects and advantages of the present invention will become more apparent from the following description, reference being had to the accompanying drawings wherein the preferred embodiment of the present invention is clearly shown.

In the drawings:

FIG. 1 is a fragmentary perspective view with the armrest of the instant invention installed;

FIG. 2 is a view taken along the lines 2—2 of FIG. 1;

FIG. 2a illustrates a fragmentary portion of the frame member, armrest and glass in cross section with the glass in the closed position;

FIG. 3 is a fragmentary cross-sectional view of the armrest;

FIG. 4 is an exploded perspective view of the armrest;

Figures 5, 6:
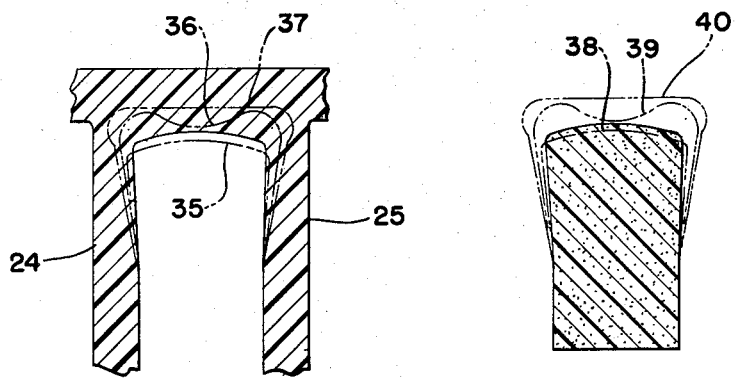
FIG. 5 is an enlarged fragmentary cross-sectional view illustrating various shapes of the channel.
FIG. 6 is a cross-sectional view of the foam or sponge insert illustrating in phantom lines the various shapes thereof.

Referring now to FIG. 1, a fragmentary portion of an automobile body is shown generally at 10. The body portion includes a door member 11 having a window frame 12. The window frame has side channel portions 13 and 14 and an upper channel 15 and window sill portion indicated generally at 16. The armrest of the instant invention is shown in position at 17 overlying the sill portion 16 in the window frame opening.

Referring now to FIG. 2, the door member 11 terminates in a rolled-in flange 18. The inside body portion or panel 19 also terminates in a rolled-in flange 20, the flanges 18 and 20 being spaced to provide an opening to receive the window glass 21 indicated fragmentarily. Each of the flanges 18 and 20 is provided with a suitable insulation strip 22, made of felt, nylon or the like.

The armrest 17 is generally T-shaped in cross section and is comprised of a transverse portion 23 and depending leg portions 24 and 25. The leg portions 24 and 25 are spaced apart a distance slightly less than the thickness of the glass pane shown at 21 so as to be frictionally retained by the edge of the pane. The transverse portion is slightly thicker at the central section, tapering off at the edges so as to merge smoothly with the door member 11 and panel 19.

A sponge block 26 is snugly received in the channel 27 formed by the depending leg portions 24 and 25. The block 26 is of lesser height than the channel so that a free end portion of the legs 24 and 25 may be inserted over the window 21. The width is slightly greater than the space between the legs 24 and 25. The detail of this construction can be more clearly seen with reference to FIG. 3 which shows a rectangular block member 26 snugly held by the depending leg portions 24 and 25 with the free ends indicated at 27 and 28, respectively. The generally T-shaped member 17 is composed of flexible or elastomeric material which may be of the closed cell variety, such as rubber, plastic, synthetic resins and the like, with the only requisite being that the cure does not harden the elastomer beyond acceptable flexibility. A pair of pockets 30 and 31 are formed in the bottom of the channel by the leg portions 27 and 28 and the transverse portion 23. The pockets serve the function of allowing the flow of the sponge material 26 therein to conform to any of a variety of window pane shapes.

Figure 7:
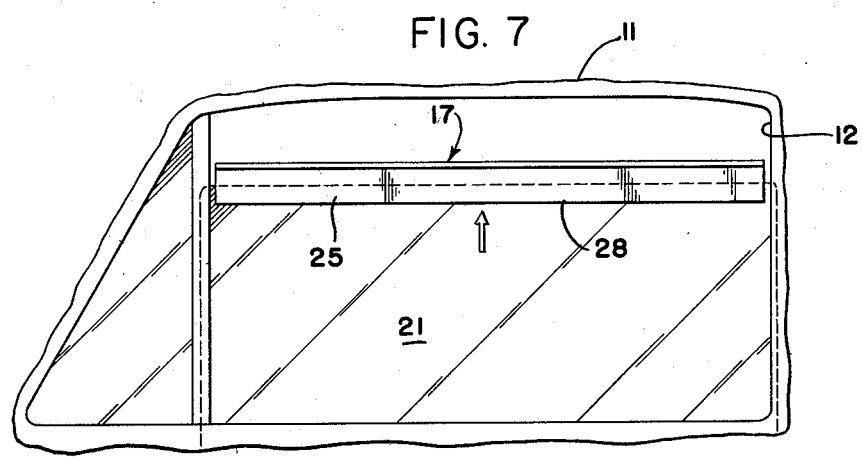
FIG. 7 is a fragmentary elevational view of the door of FIG. 1 with the window part way closed.

The pockets further serve as air chamber means to cushion the window in the up position as shown in FIG. 2a. The generally T-shaped member is shown with the transverse portion 23 seated on the outer edges of the upper channel member as at 32 and 33. The flexibility of the transverse member 23 allows for good fluid-tight seating at the points indicated at 32 and 33 so as to be rain proof and wind proof. This feature is important since in most prior art devices the armrest must be deflected or removed in order to roll the window to the closed position. As is apparent in FIGS. 7 and 8, with the instant device, once inserted on the window member 21, the free leg portions 27 and 28 will frictionally grip the upper edge of the window member so as to allow the window to be opened and closed while carrying the armrest member along with it.

Figure 8:
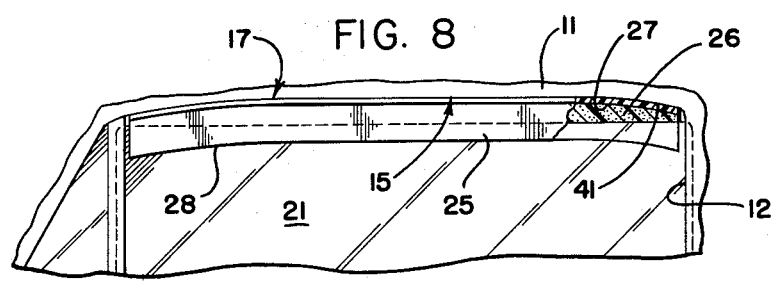
FIG. 8 is a view similar to FIG. 7 with the window in the closed position.

As is seen in FIG. 8, when the window frame is slightly arcuate at the upper edge, the sponge insert 26 flows into the pocket members as well as being compressed slightly so as to allow the armrest member to conform to the curvature of the upper frame member 15.

As seen in FIGS. 5 and 6, a wide variety of pocket configurations may be employed to serve the function heretofore noted. For example, the fragmentary lines 35, 36 and 37 are but a few examples of the shape of the pocket member which allows the sponge member to extrude as well as compress in conforming to various shapes.

In FIG. 6, the fragmentary lines 38, 39 and 40 indicate various shapes the sponge member may take. For example, the various shapes, such as a projection on one member and a pocket in the other, could be employed to effect a snap fit of the sponge member into the channel formed by the leg members 24 aand 25. The pockets and projections could be provided on either of the members, depending upon the ease of manufacturing.

The sponge member 26 allows a close fit with the glass 21 and irregular upper frame members 15 such as that indicated at 41. The durometer of the elastomer is such that it will conform to the shape of slightly arcuate windows and frames. The sponge insert obviously is of lesser durometer than the generally T-shaped member 17. It can be seen that the objections noted above with respect to the prior art are obviated by the instant device. The armrest 17 is exceedingly convenient in that it is not necessary to remove the same in order to close the window while retaining the advantage of being in place when the window is rolled down. Moreover, it allows the armrest to be adjusted up and down by positioning the window, thereby providing different armrest elevations to accommodate the individual preferences of any user. Additionally, it serves the function, as is best seen in FIG. 2, of preventing lateral movement of the window member 21 should the felt members 22 become worn, thereby cushioning the glass against vibration and impacts.

Although a single preferred embodiment has been shown and various terminology employed in describing the same, it is not intended that this be limiting, inasmuch as such was done in the interests of clarity in defining the invention. It is, however, intended that the scope of the invention be defined by the spirit and scope of the appended claim.

I claim:

An automobile window armrest comprised of an elastomeric outer element and inner element, said elements having a length adaptable to the corresponding length of the window channel located in the automobile window sill, said outer element having a width greater than said channel, consisting of a pad and attaching means, said pad providing an armrest surface and having substantially greater width than thickness, said attaching means being two parallel ribs, perpendicularly disposed from the under side of said pad, said ribs extending into the respective spaces defined by the window-glass pane and the lateral surfaces of said window sill channel, said window-glass pane thus interposed between said ribs, said elastomeric inner element interposed between said ribs and contiguous to the respective inner lateral surface of said ribs, said inner element being further contained by the under surface of the armrest pad and the top surface of said window-glass pane.

References Cited in the file of this patent

UNITED STATES PATENTS

| | | |
|---|---|---|
| 1,873,190 | Doller | Aug. 23, 1932 |
| 2,948,565 | Johnson | Aug. 9, 1960 |